Sept. 18, 1923.  1,468,424

C. J. VANN

FOOD DISPENSING MACHINE

Filed May 19, 1921  2 Sheets-Sheet 1

Inventor
Charles J. Vann.
By his Attorney

Sept. 18, 1923.

C. J. VANN 1,468,424

FOOD DISPENSING MACHINE

Filed May 19, 1921   2 Sheets-Sheet 2

Inventor
Charles J. Vann
By his Attorney

Patented Sept. 18, 1923.

1,468,424

UNITED STATES PATENT OFFICE.

CHARLES J. VANN, OF BROOKLYN, NEW YORK.

FOOD-DISPENSING MACHINE.

Application filed May 19, 1921. Serial No. 470,929.

*To all whom it may concern:*

Be it known that I, CHARLES J. VANN, a citizen of the United States, residing at Brooklyn, in the county of Kings and State of New York, have invented certain new and useful Improvements in Food-Dispensing Machines, of which the following is a specification, reference being had therein to the accompanying drawing.

My invention relates to improvements in food dispensing apparatus, and more particularly has reference to a machine adapted for holding and serving butter and similar material in predetermined quantities and shapes, means being provided for keeping the product at proper temperature therein.

Figure 1:
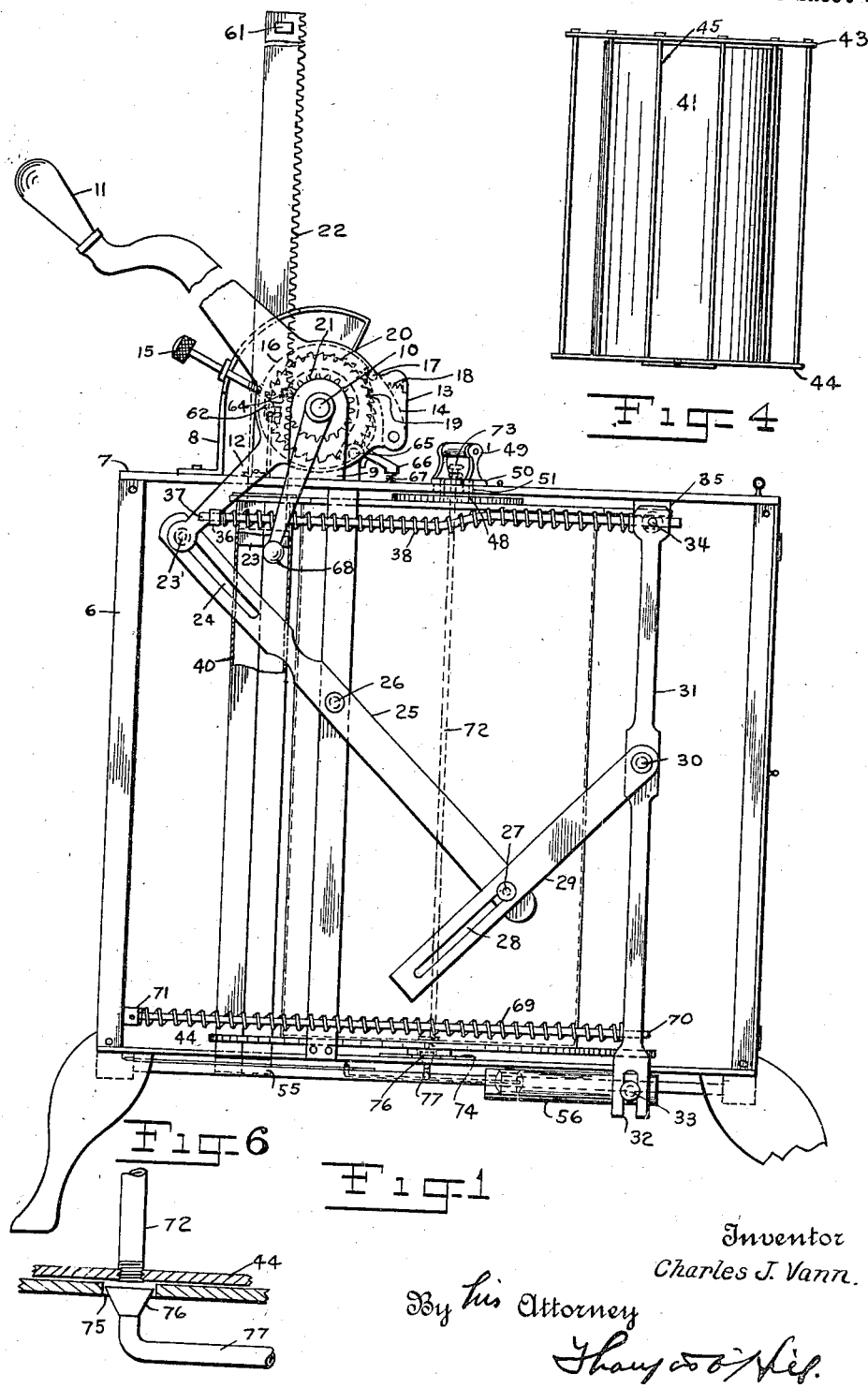
Figure 2:
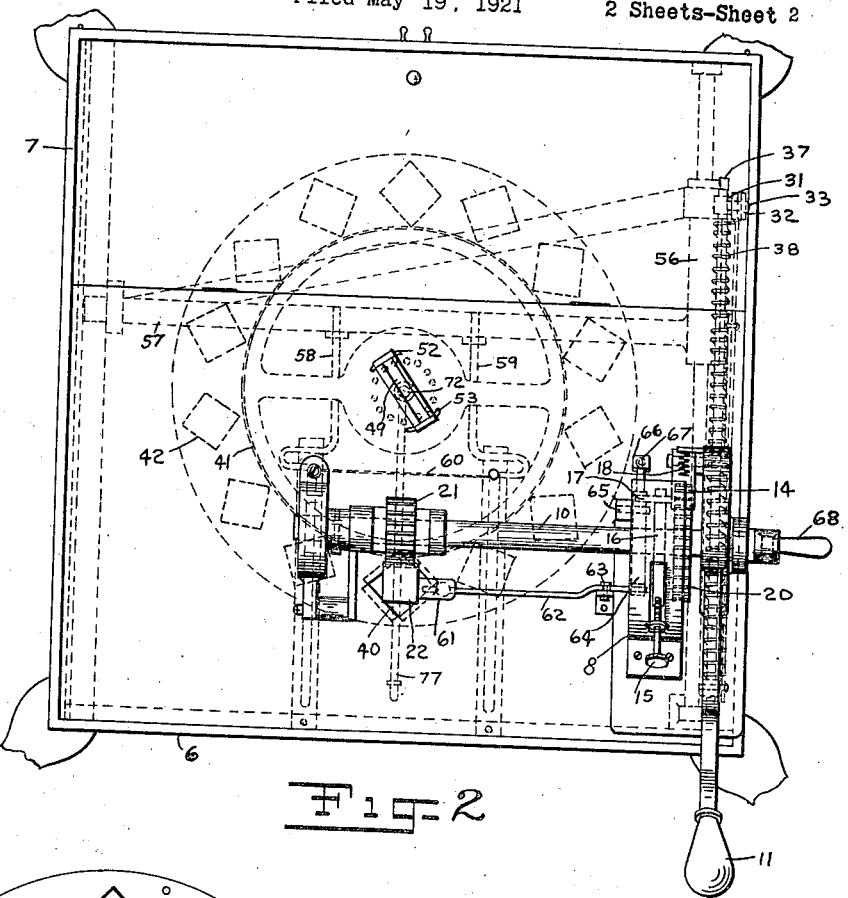
Figure 3:
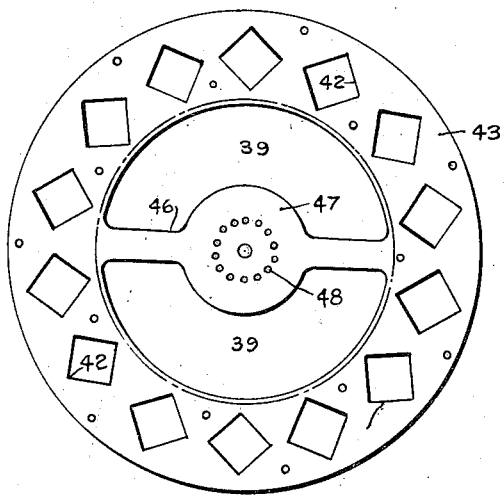

Referring to the accompanying drawings, I have illustrated in Fig. 1, in vertical side elevation. with the side removed. a suitable form of apparatus, embodying an application of my invention. Fig. 2, is a plan view looking down upon the same at right angles. Fig. 3, is the top or cap fitting of the cylinder or inner container within which the butter or other food product, and ice is retained. Fig. 4, is a side elevation of the same, Fig. 5, is an enlarged detail view of one of the food chutes, parts being broken away, and Fig. 6, is an enlarged detail of the ice draining mechanism.

Figure 5:
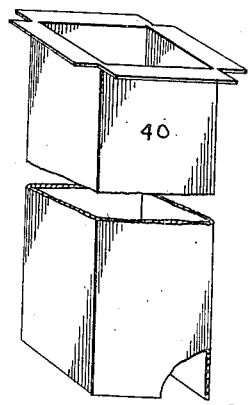

6 indicates the outer casing of the machine, and 7 the top thereof, upon which a suitable support 8 is mounted, and 9 is another support mounted upon the top 7, providing bearing for the shaft 10. 11 indicates the handle for operating the apparatus and may be cast or otherwise formed in a single piece providing projections or arms such as 12 and the bearing 13 for the pawl 14, hereinafter referred to. 15 indicates a thumbscrew provided with a knurled head as shown, and which passes through the support 8 to bear upon the face of the cam 16, said cam being beneath the roller 17 in the end of the pawl 14. which said pawl is normally projected leftwardly looking at Fig. 1, by the spring 18, so that the tooth 19 of said pawl engages the teeth of the pinion 20, mounted upon said shaft 10 which also carries the pinion 21, which meshes with the rack 22, the lower end of which serves as a plunger 23 adapted to pass through the container such as shown in Fig. 5, to drive the butter or other material therethrough.

The arm 12 is provided with a pivotal bearing 23' at the end thereof, adapted to slide within the slot 24 of the lever 25, pivoted at 26 to the casing of the machine, the lower end of said lever 25 also being provided with a suitable bearing 27 adapted to slide within the slot 28 of the lever 29, pivotally mounted at 30 to the lever 31, bifurcated at the lower end as indicated at 32 to receive the roller bearing 33, hereinafter referred to. The upper end of the lever 31 is pivotally mounted at 34 as shown, and is secured to the casing by the bracket 35. 36 indicates a housing upon the arm 12 through which the rod 37 slidably projects, so that as the lever or arm 12 sweeps anti-clockwise, looking at Fig 1, the spring 38 is compressed upon the rod 37 by the traveling housing 36 of said arm 12, the compression of the spring normally tending to return the arm 12 and its attached hand lever 11, to the normal or starting position.

In operation, the top of the container, shown to advantage in plan view in Fig. 3, is first placed upon the top of the can 41, as shown in Fig. 4, and the same is placed in the centre of the rectangular outer casing 6, as shown in dotted outline in Fig. 1, cracked ice, or other suitable refrigerant being inserted in the space 39, the butter chutes 40 being slid through the rectangular openings 42, the upper and lower plates 43—44 of the container being suitably connected by stay rods such as 45, as shown. The top plate 43 it will be observed by reference to Fig. 3, is connected across the central opening thereof by a bridge-work 46, in the centre of which a disc 47 is provided with a circle of holes 48. 49 indicates a suitable handle from the base 50 of which projects a pair of pins 51 adapted to pass through the holes 48. 52—53 indicate circular slots through the cover 7 of the outer casing and through which the pins 51 project on their way to the holes 48, from which it will be seen that after the handle 49 is in position, it may be rotated a distance governed by the length of the slots 52—53 which is predetermined accurately to be the distance of travel of one of the rectangular openings 42, so that by one twist of the handle 49, the food container will be rotated one-fourteenth of a revolution, thus providing a suitable means for shifting the butter chutes successively in position beneath the plunger 23.

When the handle 11 has depressed, the pawl 14 rotating the ratchet wheel 20 upon the shaft 10 causes the pinion 21 to rotate anti-clockwise looking at Fig. 1, thereby causing the rack 22 and its plunger 23 to pass downwardly through the butter chute 40 causing a column or rod of butter 55 to emerge beneath the bottom of the casing 6. At the same time the arm 12 operating the rods 25, 29, and 31, causes the carriage 56 to travel leftwardly, looking at Fig. 1, or in the direction of the observer, looking at Fig. 2, said carriage 56 having a laterally projecting arm 57 to which is secured the brackets 58—59, between the ends of which are secured the cutting wire 60 which moving in the direction of the observer, severs the end of the column of butter 55 which drops upon a plate or other suitable receptacle in position to receive it, the handle and its connected levers returning to their original position under influence of the spring 38, as aforesaid.

After the rack 22 has descended sufficiently far to have discharged, say the entire column of butter, the projection 61 from the side of the rack 22 comes in the path of the rod 62, pivoted at 63, the inner end of which is in the path of the semi-circular member 64 which is pivoted at 65 and which has a lateral projection 66 resting upon the spring 67 which is thereby depressed, the elevation of the semi-circular member 64 engaging beneath the roller 17 of the pawl 14, thereby disengaging said pawl from the ratchet 20 and disconnecting the source of power applied to the rack 22, thus discontinuing further operation upon that particular column of butter. At this point, by operating the handle 49, as previously described, a new column of butter is brought into position, and so on, until the entire fourteen columns have been cut up and disposed of, when the inner container may be withdrawn and recharged.

Before the new column can be used, however, the rack 22 must be returned to its uppermost position for which purpose the handle 68 may be rotated clockwise, the pawl 14 being clear of the ratchet wheel 20 by the engagement of the roller 17 of the pawl by the semi-circular member 64. When the rack 22 has been returned as aforesaid, the lever 62 being relieved of the weight of the projection 61, now releases the semi-circular member 64, and allows the pawl to again engage the ratchet wheel 20, whereupon operation may be resumed.

The adjustment of the cam by the thumbscrew 15 determines the point at which the roller 17 shall be lifted from engagement with the pinion 20, thus determining the degree or extent of rotation of the shaft 10 by each power thrust of the hand lever 11, which is the equivalent of determining the length of stroke of the rack 22, and accordingly the thickness of the chip of butter from the column. The spring 69 upon the rod 70 is compressed against the block 71 each time the lower end of the lever 31 sweeps leftwardly, looking at Fig. 1, to cut a chip of butter, and as soon as the handle 11 is released, is returned rightwardly under the action of said spring, thus restoring all parts to normal position after each operation.

The bottom of the can 41 is also provided with a hole at the centre, tapped to receive the lower end of the threaded rod 72 provided with a handle 73. This serves as a plug to release the water from the ice whenever it is so desired, and the platform 74 is also cut away as indicated at 75, in Fig. 6, to allow clearance for a flare end 76 of a drain pipe 77 for carrying away the water from the melting ice.

Of course it will be understood that various modifications may be made in the construction and arrangement of parts without departing from the spirit of the invention as claimed.

I claim:

1. In a machine of the class described, a cutting off mechanism having a reciprocable frame with a cutter moving in the path of the material to be cut, a lever pivoted to said frame, a second lever slidably connected to said first mentioned lever and pivoted to said machine, and an operating handle connected to said second lever and adapted when operated to reciprocate said cutter by said levers.

2. In a machine of the class described, a cutting off mechanism having a reciprocable frame with a cutter moving in the path of the material to be cut, a lever pivoted to said frame, a second lever slidably connected to said first mentioned lever and pivoted to said machine, and an operating handle connected to said second lever and adapted when operated to reciprocate said cutter by said levers, and in combination therewith means for feeding said material to be cut.

3. In a machine of the class described, a cutting off mechanism having a reciprocable frame with a cutter moving in the path of the material to be cut, a lever pivoted to said frame, a second lever slidably connected to said first mentioned lever and pivoted to said machine, and an operating handle connected to said second lever and adapted when operated to reciprocate said cutter by said levers, and in combination therewith means for feeding said material to be cut and means for adjusting the thickness of said cut.

In testimony whereof I hereunto affix my signature.

CHARLES J. VANN.